United States Patent
Bartolome et al.

(10) Patent No.: US 12,151,168 B2
(45) Date of Patent: Nov. 26, 2024

(54) SYSTEMS AND METHODS FOR REDUCED FRICTION REPORTING OF DISRUPTIVE BEHAVIOR INCIDENTS IN CLOUD-BASED GAMING

(71) Applicants: Sony Interactive Entertainment LLC, San Mateo, CA (US); Sony Interactive Entertainment Inc., Tokyo (JP)

(72) Inventors: Angela Bartolome, San Mateo, CA (US); Celeste Bean, San Francisco, CA (US); Olga Rudi, San Francisco, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 151 days.

(21) Appl. No.: 17/865,977

(22) Filed: Jul. 15, 2022

(65) Prior Publication Data
US 2024/0017177 A1 Jan. 18, 2024

(51) Int. Cl.
*A63F 13/75* (2014.01)
*A63F 13/35* (2014.01)
(Continued)

(52) U.S. Cl.
CPC ............ *A63F 13/75* (2014.09); *A63F 13/355* (2014.09); *A63F 13/424* (2014.09);
(Continued)

(58) Field of Classification Search
CPC ........ A63F 13/497; A63F 13/70; A63F 13/75; A63F 13/79; A63F 13/85;
(Continued)

(56) References Cited

U.S. PATENT DOCUMENTS

| | | | |
|---|---|---|---|
| 7,881,944 B2* | 2/2011 | Heller | G06Q 30/0185 705/319 |
| 2009/0174702 A1* | 7/2009 | Garbow | G06Q 50/265 345/419 |

(Continued)

FOREIGN PATENT DOCUMENTS

WO 2022076136 A1 4/2022

OTHER PUBLICATIONS

PCT Application No. PCT/US2023/023778, International Search Report and Written Opinion of the International Searching Authority, Mailed on Sep. 25, 2023, 11 pages.

*Primary Examiner* — Lawrence S Galka
(74) *Attorney, Agent, or Firm* — Penilla IP, APC (57) ABSTRACT

A disruptive behavior incident flag notification is received from a game player that marks a time during play of a video game corresponding to a potential disruptive behavior incident. A video clip for the disruptive behavior incident flag notification is automatically generated and stored with the disruptive behavior incident flag notification in association with an account of the game player. The game player accesses and reviews the disruptive behavior incident flag notification and corresponding generated video clip. The game player applies a validation indicator to the disruptive behavior incident flag notification. The validation indicator for the disruptive behavior incident flag notification as received from the game player is used to prioritize the disruptive behavior incident flag notification and corresponding generated video clip for platform moderator review. An incident reporting score for the game player is updated based on a platform moderator report for the disruptive behavior incident flag notification.

20 Claims, 6 Drawing Sheets

(51) Int. Cl.

| | |
|---|---|
| *A63F 13/355* | (2014.01) |
| *A63F 13/424* | (2014.01) |
| *A63F 13/428* | (2014.01) |
| *A63F 13/63* | (2014.01) |
| *A63F 13/79* | (2014.01) |
| *G06N 5/04* | (2023.01) |
| *G06N 20/00* | (2019.01) |

(52) U.S. Cl.
CPC ............ *A63F 13/428* (2014.09); *A63F 13/63* (2014.09); *A63F 13/79* (2014.09)

(58) Field of Classification Search
CPC ........ A63F 2300/535; A63F 2300/5546; A63F 2300/556; A63F 2300/5586; A63F 2300/57; A63F 2300/572; A63F 2250/58; G06Q 50/01; H04L 12/1831; H04L 63/30; G06F 16/9035
See application file for complete search history.

(56) References Cited

U.S. PATENT DOCUMENTS

| | | | |
|---|---|---|---|
| 2017/0225079 A1* | 8/2017 | Conti | A63F 13/35 |
| 2021/0370183 A1 | 12/2021 | Dorn et al. | |
| 2021/0370188 A1 | 12/2021 | Thomas et al. | |
| 2021/0402304 A1* | 12/2021 | Dorn | G06N 20/00 |
| 2022/0111297 A1* | 4/2022 | Rudi | A63F 13/79 |
| 2024/0033643 A1* | 2/2024 | Osman | A63F 13/75 |

* cited by examiner

| Incident Report ID | Date/Time | Video Clip | Validate | Moderator Review | Cancel Incident |
|---|---|---|---|---|---|
| IR001 | 07/05/2022 18:42 | Review | ✓ | Submit | Cancel |
| IR002 | 07/07/2022 12:22 | Review | ✓ | Pending | --- |
| IR003 | 07/08/2022 08:46 | Review | ✓ | Affirmed | --- |
| IR004 | 07/13/2022 15:05 | Review | ✓ | Dismissed | --- |
| IR001 | 07/14/2022 08:14 | Review | ☐ | Submit | Cancel |
| IR005 | 07/14/2022 09:03 | Review | ☐ | Pending | --- |
| IR006 | 07/14/2022 17:38 | Review | ☐ | Affirmed | --- |
| IR007 | 07/14/2022 18:07 | Review | ☐ | Dismissed | --- |
| ... | ... | ... | ... | ... | ... |
| IR(N) | 07/28/2022 19:22 | Review | ☐ | Dismissed | --- |

Player ABC_xyz  DBIRS: 84  Close

Platform Moderator: M7722

| Reporting Player ID | DBIRS | Incident Report ID | Incident Date/Time | Video Clip | Affirm/Dismiss | Moderator ID | Decision Date/Time | Moderator Comments |
|---|---|---|---|---|---|---|---|---|
| 00794 | 92 | IR566 | 07/05/2022 18:42 | Review | ☐A ☐D | --- | --- | --- |
| 00794 | 92 | IR567 | 07/05/2022 19:22 | Review | ☐A ☐D | --- | --- | --- |
| 10439 | 88 | IR423 | 07/02/2022 08:46 | Review | ☑A ☐D | M0045 | 07/03/2022 10:40 | Clear violation. |
| 10439 | 88 | IR424 | 07/02/2022 15:05 | Review | ☑A ☐D | M0045 | 07/02/2022 18:05 | Sabotage. |
| 74921 | 75 | IR665 | 07/07/2022 08:14 | Review | ☐A ☑D | M0032 | 07/11/2022 11:14 | Acceptable play. |
| 04582 | 72 | IR842 | 07/11/2022 09:03 | Review | ☑A ☐D | M0963 | 07/11/2022 12:01 | Intentional foul. |
| 95272 | 69 | IR955 | 07/14/2022 17:38 | Review | ☑A ☐D | M3421 | 07/19/2022 07:22 | Allowably aggressive. |
| 00284 | 63 | IR421 | 07/02/2022 14:07 | Review | ☐A ☑D | M0021 | 07/08/2022 08:56 | No foul. |
| | | | | ... | | | | |
| 00632 | 21 | IR837 | 07/11/2022 07:22 | Review | ☐A ☐D | --- | --- | --- |

SYSTEMS AND METHODS FOR REDUCED FRICTION REPORTING OF DISRUPTIVE BEHAVIOR INCIDENTS IN CLOUD-BASED GAMING

BACKGROUND

The video game industry has seen many changes over the years and has been trying to find ways to enhance the video game play experience for players and increase player engagement with the video games and/or online gaming systems. When a player increases their engagement with a video game, the player is more likely to continue playing the video game and/or play the video game more frequently, which ultimately leads to increased revenue for the video game developers and providers and video game industry in general. Therefore, video game developers and providers continue to seek improvements in video game operations to provide for increased player engagement and enhanced player experience.

A growing trend in the video game industry is online harassment and cyberbullying in video games by players commonly referred to as abusive players, bad faith players, griefers and/or disruptive players. For example, a disruptive player can be a player in a multiplayer video game who deliberately irritates, annoys, and harasses other players within the video game. In some instances, the disruptive player will use aspects of the video game in unintended ways to disrupt normal play of the video game. The disruptive actions by disruptive players in the video game can prevent other good faith players from becoming fully immersed in their play of the video game, and thereby diminish the good faith player's game play experience. Also, the task of having to report disruptive players to a video game platform policing authority by good faith players can even further disrupt the gaming experience of the good faith players. Moreover, false or incorrect reporting of disruptive players to the video game platform policing authority can waste a significant amount of resources, including computing resources, human resources, energy resources, economic resources, data storage resources, and data communication bandwidth resources, among other types of resources. It is within this context that implementations of the present disclosure arise.

SUMMARY

In an example embodiment, a cloud-based gaming system is disclosed. The cloud-based gaming system includes a server computing system programmed to receive a disruptive behavior incident flag notification from a first game player during interactive play of a video game. The disruptive behavior incident flag notification marks a time during interactive play of the video game corresponding to a potential disruptive behavior incident by a second game player. The server computing system is programmed to automatically generate a video clip for the disruptive behavior incident flag notification that includes video of the interactive play of the video game by the first game player around the time marked by the disruptive behavior incident flag notification. The server computing system is programmed to store the received disruptive behavior incident flag notification and corresponding generated video clip in association with an account of the first game player. The server computing system is programmed to receive a request from the first game player to access and review the disruptive behavior incident flag notification and corresponding generated video clip stored in association with the account of the first game player. The server computing system is programmed to enable the first game player to access and review the disruptive behavior incident flag notification and corresponding generated video clip stored in association with the account of the first game player in response to the receipt of the request. The server computing system is programmed to enable the first game player to apply a validation indicator to the disruptive behavior incident flag notification. The server computing system is programmed to receive the validation indicator from the first game player for the disruptive behavior incident flag notification. Receipt of the validation indicator directs the server computing system to prioritize the disruptive behavior incident flag notification and corresponding generated video clip for platform moderator review.

In an example embodiment, a method is disclosed for operating a server computing system in cloud-based gaming. The method includes receiving a disruptive behavior incident flag notification from a first game player during interactive play of a video game. The disruptive behavior incident flag notification marks a time during interactive play of the video game corresponding to a potential disruptive behavior incident by a second game player. The method also includes automatically generating a video clip for the disruptive behavior incident flag notification that includes video of the interactive play of the video game by the first game player around the time marked by the disruptive behavior incident flag notification. The method also includes storing the received disruptive behavior incident flag notification and the corresponding generated video clip in association with an account of the first game player. The method also includes receiving a request from the first game player to access and review the disruptive behavior incident flag notification and corresponding generated video clip stored in association with the account of the first game player. The method also includes enabling the first game player to access and review the disruptive behavior incident flag notification and corresponding generated video clip stored in association with the account of the first game player in response to the receiving of the request. The method also includes enabling the first game player to apply a validation indicator to the disruptive behavior incident flag notification. The method also includes receiving the validation indicator from the first game player for the disruptive behavior incident flag notification. The method also includes prioritizing the disruptive behavior incident flag notification and corresponding generated video clip for platform moderator review in response to receipt of the validation indicator.

DETAILED DESCRIPTION

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Figure 1:
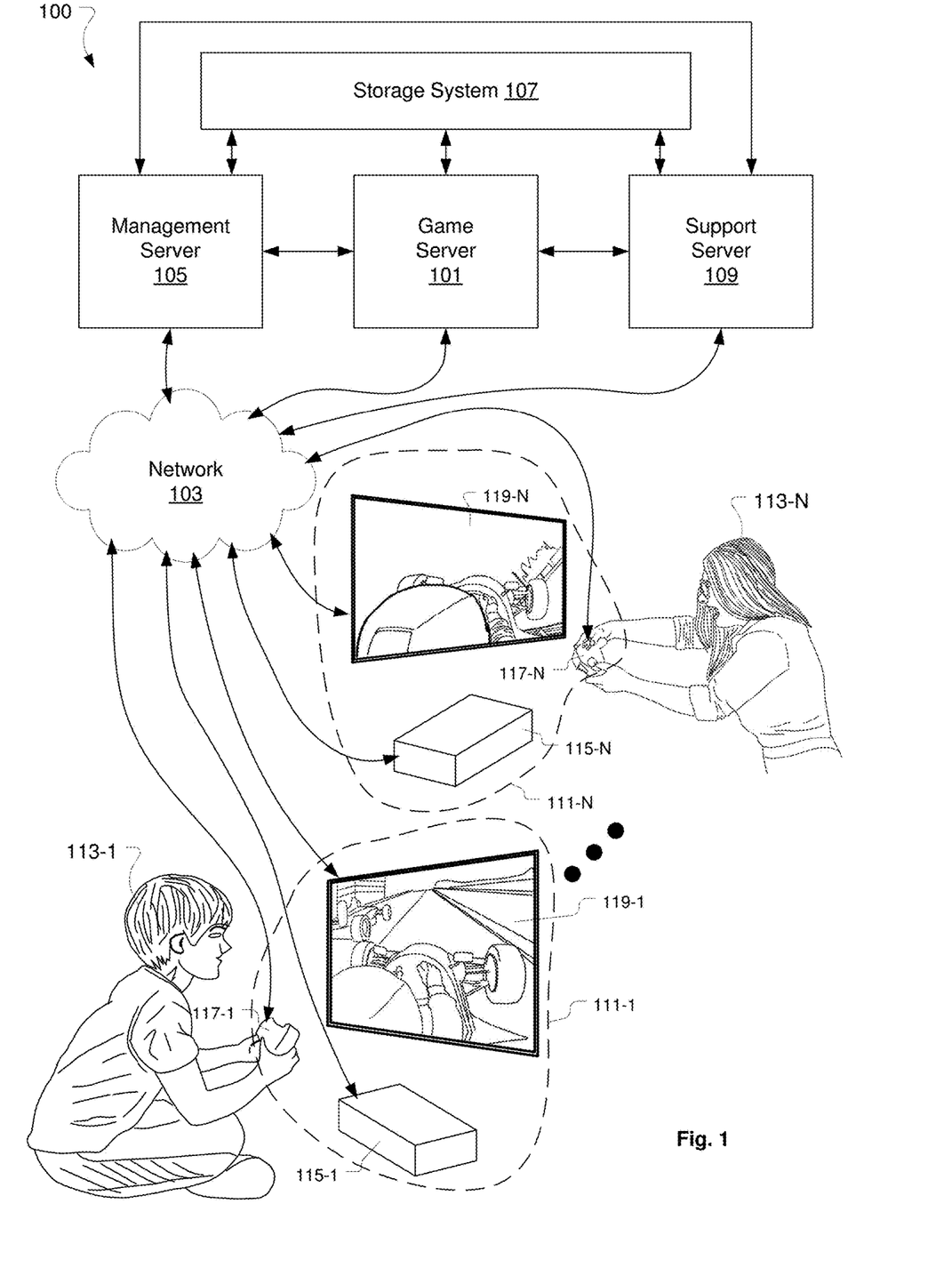
FIG. 1 shows an overview of an online gaming system for serving online multiplayer video games, in accordance with some embodiments.

An online multiplayer video game can include multiple players interacting within a common game context. The online multiplayer video game is executed on one or more server computing systems that function to generate and stream video game content to each player, where the video game content for a given player is unique to the given player's situation and point of view within the common game context. FIG. 1 shows an overview of an online gaming system 100 for serving online multiplayer video games, in accordance with some embodiments. The online gaming system 100 includes one or more game server(s) 101 connected for bi-directional data communication with a network 103, such as the Internet. In some embodiments, the game server 101 is a computing device configured to execute the online multiplayer video game, or some portion of the online multiplayer video game. In some embodiments, one or more management server(s) 105 is/are connected for bi-directional data communication with the game server 101 and for bi-directional data communication with the network 103. The management server 105 can be configured to handle overhead tasks associated with the online gaming system 100, such as handling of game selection requests and placement of players in various game sessions or game rooms, by way of example. In various embodiments, the management server 105 is configured to handle essentially any task needed to support operation of the online gaming system 100 and game play. The online gaming system 100 also includes one or more storage system(s) 107 connected for bi-directional data communication with the game server 101 and for bi-directional data communication with the management server 105. The storage system 107 functions to store data associated with games served by the online gaming system 100 and data associated with players that engage with the online gaming system 100. In various embodiments, the online gaming system 100 includes one or more additional support server(s) 109 in bi-directional data communication with one or more of the game server 101, the management server 105, and the storage server 107. In various embodiments, the support server 109 is configured to assist with essentially any computing task associated with operation of the online gaming system 100.

The online gaming system 100 is configured to simultaneously receive data communication from and send data communication to computing devices 111-1 through 111-N local to and respectively operated by a number (N) of multiple players 113-1 through 113-N. In some embodiments, the game server 101 is used to perform operations of a durational information platform for video game players. Online video games played over the Internet operate through a connection to the game server 101. Typically, online games use a dedicated server application that collects data from and distributes data to the players 113-1 through 113-N. The computing devices 111-1 through 111-N are respectively connected to the network 103 to enable data communication to and from the online gaming system 100. In various embodiments, the data communication between the computing devices 111-1 through 111-N and the network is implemented through any known data communication means, such as transmission of signals through wires or through the air by wireless means, such as through WIFI, BLUETOOTH, cellular, radio, optical, satellite, and/or other wireless communication systems. In various embodiments, the computing devices 111-1 through 111-N include game system consoles 115-1 through 115-N and/or control devices 117-1 through 117-N and/or television/display systems 119-1 through 119-N. In various embodiments, the control devices 117-1 through 117-N include one or more of a game controller, a keyboard, a head-mounted display (HMD) device, and a game input device (such as a wand, pointer, bat, club, racket, paddle, gun, steering device, pedal device, or any other form of game input/control device), or other type of control device. In some embodiments, the television/display systems 119-1 through 119-N are connected to one or more ancillary computing/communication devices, such as a dongle, to enable data communication between any two or more of the television/display systems 119-1 through 119-N, the control devices 117-1 through 117-N, the game system consoles 115-1 through 115-N, and the network 103.

Many online multiplayer video games provide for interaction between multiple players 113-1 through 113-N, which can include opposing game play, individual game play, and/or team game play. Also, many online multiplayer video games provide for communication between players 113-1 through 113-N, where the players can be either opposing each other, or on the same team, or acting as an independent player within a given game context. Such player-to-player communication can be done by chat/text communication, voice communication, or other types of data/content communication, e.g., picture, video, emoticon, etc., depending on what the game allows and/or what the online gaming system 100 allows. Interactivity and communication between players 113-1 through 113-N in online multiplayer video games can significantly improve the richness of the game experience. However, the interactivity and communication between players 113-1 through 113-N in online multiplayer video games also provides opportunities for disruptive behavior, which may detract from or diminish the game experience of some players and/or interfere with proper and efficient operation of the online gaming system 100, and particularly of the game server 101 and/or storage system 107.

A disruptive behavior by a player can occur on a system level or within a particular game context, or both. A disruptive behavior is essentially any behavior that violates the Code of Conduct of the gaming system provider and/or that disrupts normal and fair game play. For example, disruptive behavior includes offensive communication over voice chat and/or text chat, or through use of emoticons, or by any other communication means. Disruptive behavior also includes abuse of game mechanics/actions, such as inappropriate game actions, deliberately not completing in-game tasks when required, causing an in-game entity to die or be eliminated on purpose, and not acquiring an in-game asset when possible, among others. Disruptive behavior also includes abusive player-to-player interaction and griefing, such as excessive and intentional action to spite another player, including but not limited to tripping, blocking, killing, sabotaging, and spying, among others. Disruptive behavior also includes abuse, harassment, or stalking of another player. Disruptive behavior also includes an action, upload, post, stream, or transmission of any content, language, images, or sounds that are offensive, hateful, or vulgar, as determined by the online gaming system 100 provider/authority. Disruptive behavior also includes any player communication or content provision that is deemed racially, ethnically, religiously or sexually offensive, libelous, defaming, threatening, bullying or akin to stalking, as determined by the online gaming system 100 provider/ authority. Disruptive behavior also includes any player communication that attempts to organize a hate group. Disruptive behavior also includes an action that is disruptive to the normal flow of chat or gameplay, as determined by the online gaming system 100 provider/authority, including uploading, posting, streaming, or transmitting any unsolicited or unauthorized material, including junk mail, spam, excessive mail or chain letters. Disruptive behavior also includes transmission of content that is commercial in nature such as advertisements, solicitations, promotions, or links to web sites. Disruptive behavior also includes impersonation of any person or player or online gaming system 100 authority. Disruptive behavior also includes cheating, exploiting, or using any bugs, glitches, vulnerabilities or unintentional game mechanics to obtain an unfair advantage or interfere with normal game flow and operation. Disruptive behavior also includes use of hate speech, such as use of racist slurs or uploading prejudiced content. Disruptive behavior also includes threatening of other users/players, such as threatening to harm them physically or making them feel unsafe in any way. Disruptive behavior also includes bullying of other users, such as making fun of their personal beliefs, physical traits, or gaming ability. Disruptive behavior also includes promotion of vulgar or offensive content, such as creating an inappropriate online ID, even if the offensive word is only hinted or implied. Disruptive behavior also includes posting of erotic or pornographic imagery. Disruptive behavior also includes encouragement of self-harm or suicide. Disruptive behavior also includes participating in illegal acts, such as using the gaming system communication mechanisms to sell drugs or other illegal products. Disruptive behavior also includes violating another's privacy, such as sharing their personal details or photos on the gaming system. Disruptive behavior also includes disrupting the gaming experience of others by being loud, rude, or purposely annoying. And, disruptive behavior includes any behavior that would violate local, state, or federal laws.

In some instances, disruptive player behavior in online multiplayer video games can interfere with normal game flow and/or with normal game execution by the game server 101. For example, if a player discovers and exploits a bug or a glitch in the online game, corresponding computational pressure on the game server 101 can increase to a point where the ability of the online game system 100 to serve games to other players is adversely affected. Also, in another example, if a player or group of colluding players intentionally disrupts the normal game flow by performing unwarranted actions and/or actions of sabotage, the computational pressure on the game server 101 is unnecessarily increased, which is a waste of resources, energy consumption, and time. Also, if a player intentionally disrupts the normal game flow by performing unwarranted actions and/or actions of sabotage, the data associated with those actions is stored in the storage system 107, which is an unnecessary waste of storage resources and an unnecessary consumption of valuable data communication bandwidth with the storage system 107.

In some instances, disruptive player behavior in online multiplayer video games can be toxic or abusive, and require corrective action such as suspension or banning of a player from the online multiplayer video game. But, not all disruptive behavior within the online multiplayer video gaming context warrants suspension or banning of a player from the online multiplayer video game. There is usually a progression of disruptive behavior within a given game context. Also, some games may intentionally allow for more disruptive behavior than other games, especially when considering how games are developed for play by people of different ages. There may be players within the online multiplayer video game that are considered disruptive players for one or more reasons, but have not reached a level of disruptive behavior that warrants suspension or banning. Therefore, it is almost inevitable that in most online multiplayer video games, a given player will encounter one or more other players that exhibit some type of disruptive behavior. It is of interest to provide systems and methods to enable a player to provide low-friction and high-quality reporting of disruptive player behavior to the online gaming system 100 provider/authority, so that the reported disruptive behavior can be subjected to platform moderator review and corrective action can be taken, as appropriate. Also, in some embodiments, it may be helpful to provide a player who is exhibiting disruptive behavior with a warning, such as a warning indicator or behavior score or another type of warning, to apprise the player of their behavior status and afford the player an opportunity to mitigate and/or cease their disruptive behavior before correction action is taken against the player.

In some embodiments, in order for a player to report a disruptive behavior incident, the player has to exit the game that they are playing and navigate through one or more menus of options to generate and submit a disruptive behavior incident report. This is a high-friction approach for disruptive behavior incident reporting because it disrupts the players game playing experience. Also, some online games do not allow for pausing of the game. Therefore, if the player felt that they had to report the disruptive behavior incident right away, the player would have to leave the game that they are currently playing, which further adversely affects the player's game playing experience. Methods and systems are described herein for providing a low-friction disruptive behavior incident reporting mechanism that does not require interruption of the player's game play. The methods and systems described herein also provide for post-game-play review and submittal of a disruptive behavior incident report, which enables the reporting player to do a pre-submittal review of the disruptive behavior incident to determine whether or not the disruptive behavior incident actually warrants submittal of a disruptive behavior incident report for platform moderator review. The pre-submittal review of the disruptive behavior incident by the reporting player can significantly improve the efficiency of disruptive behavior policing and management at the platform level. Additionally, methods and systems are described herein for generating and surfacing a quality metric for each player with regard to their disruptive behavior incident reporting activity. The quality metric is useful for prioritizing incoming disruptive behavior incident reports from various players for platform moderator review. Also, the quality metric is useful as a tool for incentivizing players to provide higher quality disruptive behavior incident reports for platform moderator review, which serves to improve the efficiency and effectiveness of the disruptive behavior policing and management at the platform level, which in turn serves to improve the overall game play experience for all players, which in turn supports sustaining and expanding the gaming ecosystem.

Figure 2:
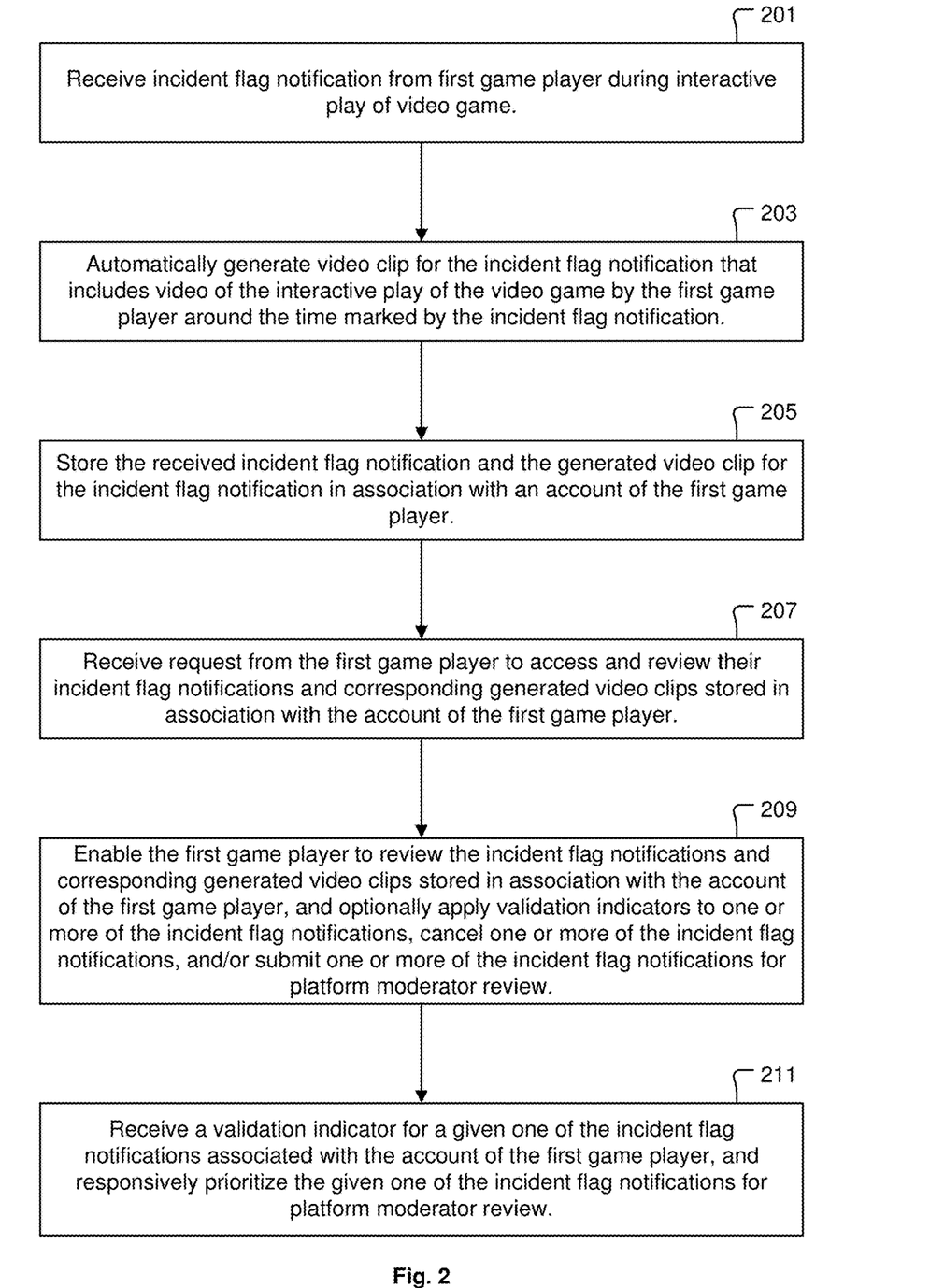
FIG. 2 shows a flowchart of a method for operating a server computing system in cloud-based gaming to provide for low-friction reporting of disruptive behavior incidents, in accordance with some embodiments.

FIG. 2 shows a flowchart of a method for operating a server computing system in cloud-based gaming to provide for low-friction reporting of disruptive behavior incidents, in accordance with some embodiments. The method includes an operation 201 for receiving a disruptive behavior incident flag notification from a first game player during interactive play of a video game. The disruptive behavior incident flag notification marks a time during interactive play of the video game corresponding to a potential disruptive behavior incident by a second game player. It should be understood that receiving the disruptive behavior incident flag notification at the server computing system in the operation 201 does not interrupt interactive play of the video game by the first game player. In some embodiments, the disruptive behavior incident flag notification corresponds to a particular controller input pattern transmitted by the first game player. In various embodiments, the particular controller input pattern corresponds to a prescribed combination and/or sequence of button/trigger activations on a video game controller device, such as on the control devices 117-1 through 117-N shown in FIG. 1. In some embodiments, the particular controller input pattern is customizable by the game player before and/or during play of the video game, such as through an options menu.

In some embodiments, the disruptive behavior incident flag notification corresponds to a particular voice command input transmitted by the first game player. For example, in some embodiments, the first game player may speak a key phrase, such as "Flag, Flag, Flag," among essentially any other phrase, that can be recognized by voice recognition software executing on the server computing system. In these embodiments, the audio input from the first game player at the server computing system is continuously monitored and processed to detect the presence of a key phrase that corresponds to the disruptive behavior incident flag notification by the first game player. In some embodiments, the key phrase for throwing the disruptive behavior incident flag notification by the first game player is customizable by the first game player before and/or during play of the video game, such as through an options menu.

In some embodiments, the disruptive behavior incident flag notification corresponds to a particular video-captured human gesture transmitted by the first game player. For example, in some embodiments, the first game player may make a key gesture, such as an overhead wave by an arm and hand, among essentially any other gesture, that can be recognized by video processing software executing on the server computing system. In these embodiments, video input received at the server computing system from a video camera positioned and operated to capture video of the first game player is continuously monitored and processed to detect the presence of the key gesture that corresponds to the disruptive behavior incident flag notification by the first game player. In some embodiments, the key gesture for throwing the disruptive behavior incident flag notification by the first game player is customizable by the first game player before and/or during play of the video game, such as through an options menu.

The method continues with an operation 203 for automatically generating a video clip for the disruptive behavior incident flag notification that includes video of the interactive play of the video game by the first game player around the time marked by the disruptive behavior incident flag notification. In some embodiments, the video clip extends from a first time to a second time, where the first time is a prescribed duration before the time corresponding to receipt of the disruptive behavior incident flag notification from the first game player, and where the second time is a prescribed duration after the time corresponding to receipt of the disruptive behavior incident flag notification from the first game player. In some embodiments, the prescribed durations before and after the time corresponding to receipt of the disruptive behavior incident flag notification from the first game player that are used to generate the video clip are preset by the cloud-based gaming system to provide for system-level control over how much data storage is used for storing video clips for disruptive behavior incident flag notifications. However, in some embodiments, the prescribed durations before and after the time corresponding to receipt of the disruptive behavior incident flag notification from the first game player that are used to generate the video clip are customizable by the first game player before and/or during play of the video game, such as through an options menu. It should be understood that performance of operation 203 does not interrupt interactive play of the video game by the first game player. In some embodiments, when the disruptive behavior incident flag notification is thrown by the first game player in the context of an in-game character termination event, the cloud-based gaming system automatically generates the video clip in operation 203 to ensure that the video clip captures the in-game termination event and an identifier of each game player involved in the in-game termination event.

Figure 3:
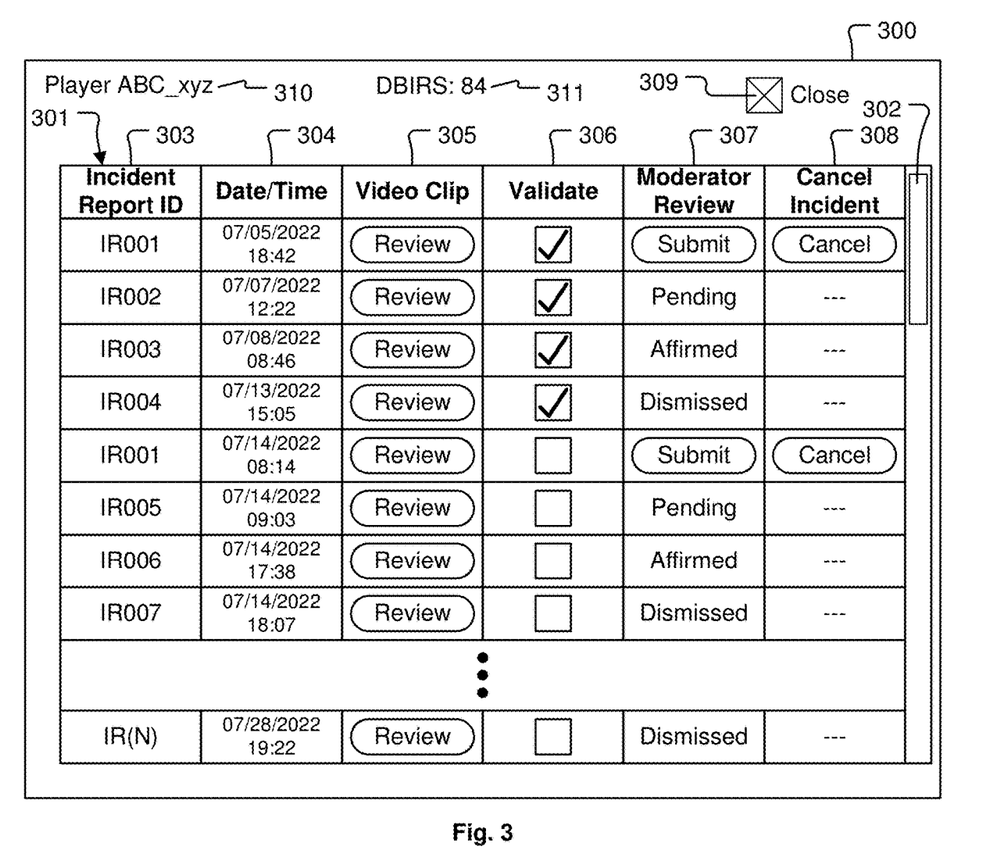
FIG. 3 shows an example diagram of how the received disruptive behavior incident flag notification and the corresponding generated video clip may be stored in association with an account of the first game player, in accordance with some embodiments.

The method includes an operation 205 for storing the received disruptive behavior incident flag notification and the corresponding generated video clip in association with an account of the first game player. In various embodiments, operation 205 is performed using a data storage system that is either local to the server computing system or accessible over a network by the storage computing system. FIG. 3 shows an example diagram of how the received disruptive behavior incident flag notification and the corresponding generated video clip may be stored in association with an account of the first game player, in accordance with some embodiments. In some embodiments, the diagram of FIG. 3 corresponds to a schema implemented within a database system. FIG. 3 shows that the first game player has thrown a number (N) of incident flag notifications, where each row corresponds to a separate disruptive behavior incident flag notification. Each disruptive behavior incident flag notification entry is associated with an identifier of the first game player, an identifier of the game being played, a date and time of receipt of the disruptive behavior incident flag notification by the server computing system. It should be understood that performance of operation 205 does not interrupt interactive play of the video game by the first game player.

The method continues with an operation 207 for receiving a request from the first game player to access and review their disruptive behavior incident flag notifications and corresponding generated video clips stored in association with the account of the first game player. It should be understood that the request received in the operation 207 is submitted by the first game player at a time that is convenient for the first game player. For example, after the first game player has finished their video game play session, the first game player may send the request to the server computing system to access and review the disruptive behavior incident flag notifications that were thrown by the first game player during their video game play session. In this manner, throwing of the disruptive behavior incident flag notification by the first game player and subsequent review of the disruptive behavior incident flag notification by the first game player at a time of their convenience does not substantially interfere with or interrupt the first game player's playing of the video game, and is, therefore, a low-friction approach for reporting of the disruptive behavior incident.

In response to receiving the request in operation 207, the method proceeds with an operation 209 in which the server computing system enables the first game player to review the disruptive behavior incident flag notifications and corresponding generated video clips stored in association with the account of the first game player. The operation 209 also enables the first game player to optionally apply a validation indicator to each disruptive behavior incident flag notification before submission of the disruptive behavior incident flag notification for platform moderator review. Application of the validation indicator to a given disruptive behavior incident flag notification conveys that the first game player has reviewed the given disruptive behavior incident flag notification and has found the corresponding generated video clip to include an actual disruptive behavior incident. The operation 209 also enables the first game player to optionally cancel a given disruptive behavior incident flag notification before submission of the disruptive behavior incident flag notification for platform moderator review, if it is found by the first game player that there was actually no disruptive behavior incident present in the generated video clip corresponding to the given disruptive behavior incident flag notification. The operation 209 also enables the first game player to optionally submit a given disruptive behavior incident flag notification for platform moderator review.

The method also includes an operation 211 in which the server computing system receives a validation indicator for a given disruptive behavior incident flag notification associated with the account of the first game player, and responsively prioritizes the given disruptive behavior incident flag notification for platform moderator review. In some embodiments, prioritization of the given disruptive behavior incident flag notification for platform moderator review includes queuing of the given disruptive behavior incident flag notification ahead of other submitted and received disruptive behavior incident flag notifications for which no validation indicator was received.

FIG. 3 shows an example graphical user interface (GUI) 300 provided to the first game player in the operation 209 for navigating, selecting, and reviewing the disruptive behavior incident flag notifications and corresponding generated video clips stored in association with the account of the first game player, in accordance with some embodiments. The GUI 300 shows an identifier 310 (e.g., ABC_xyz) of the first game player. In some embodiments, the GUI 300 shows a table 301 listing each of the disruptive incident flag notifications that have been thrown by the first game player. In some embodiments, each row of the table 301 corresponding to a different one of multiple disruptive incident flag notifications that have been thrown by the first game player. In some embodiments, the table 301 includes a scroll bar 302 for navigating to a particular row of the table 301. In some embodiments, each row of the table 301 includes a column 303 that shows an identifier for the corresponding disruptive incident flag notification. In some embodiments, each row of the table 301 includes a column 304 that shows a date and time at which the corresponding disruptive incident flag notification was thrown by the first game player. In some embodiments, the date and time shown in the column 304 for a given disruptive incident flag notification is the date and time at the management server 105 when the given disruptive incident flag notification is received from the first game player. In some embodiments, the date and time shown in the column 304 for a given disruptive incident flag notification is the date and time local to the first game player when the given disruptive incident flag notification was thrown by the first game player.

In some embodiments, each row of the table 301 includes a column 305 that shows a review button that when activated by the user will trigger display of another GUI (see FIG. 4) that provides for review of the video clip generated for the corresponding disruptive incident flag notification. In some embodiments, each row of the table 301 includes a column 306 that shows a user-selectable control for applying the validation indicator to the corresponding disruptive incident flag notification. Application of the validation indicator to a given disruptive behavior incident flag notification conveys that the given disruptive behavior incident flag notification and corresponding generated video clip has been reviewed by the first game player and has been found by the first game player to include a disruptive behavior incident that warrants platform moderator review. In this manner, the GUI 300 provides for application of the validation indicator to each disruptive behavior incident flag notification before submission of the disruptive behavior incident flag notification for platform moderator review.

In some embodiments, each row of the table 301 includes a column 307 that shows either a submit button or a platform moderator review status for the corresponding disruptive behavior incident flag notification. User activation of the submit button causes the corresponding disruptive behavior incident flag notification to be submitted to the platform authority for platform moderator review. The submit button can be activated with the validation indicator set or unset. Once the submit button is activated for a given disruptive behavior incident flag notification, the column 307 for the given disruptive behavior incident flag notification shows the platform moderator review status as "Pending." After a platform moderator review decision is issued that affirms a given disruptive behavior incident flag notification, the column 307 for the given disruptive behavior incident flag notification shows the platform moderator review status as "Affirmed." After a platform moderator review decision is issued that dismisses (does not affirm) a given disruptive behavior incident flag notification, the column 307 for the given disruptive behavior incident flag notification shows the platform moderator review status as "Dismissed."

In some embodiments, each row of the table 301 includes a column 308 that shows either a cancel button for the corresponding disruptive behavior incident flag notification. User activation of the cancel button causes the corresponding disruptive behavior incident flag notification to be cancelled before it is submitted to the platform authority for platform moderator review. In some embodiments, cancellation of a given disruptive behavior incident flag notification will cause removal of the given disruptive behavior incident flag notification from the table 301. In this manner, the GUI 300 provides for optional user-controlled cancellation of any disruptive behavior incident flag notification before submission of the disruptive behavior incident flag notification for platform moderator review. In some embodiments, the GUI 300 also includes a close button 309 that when activated will cause display of the GUI 300 to no longer be displayed.

Figure 4:
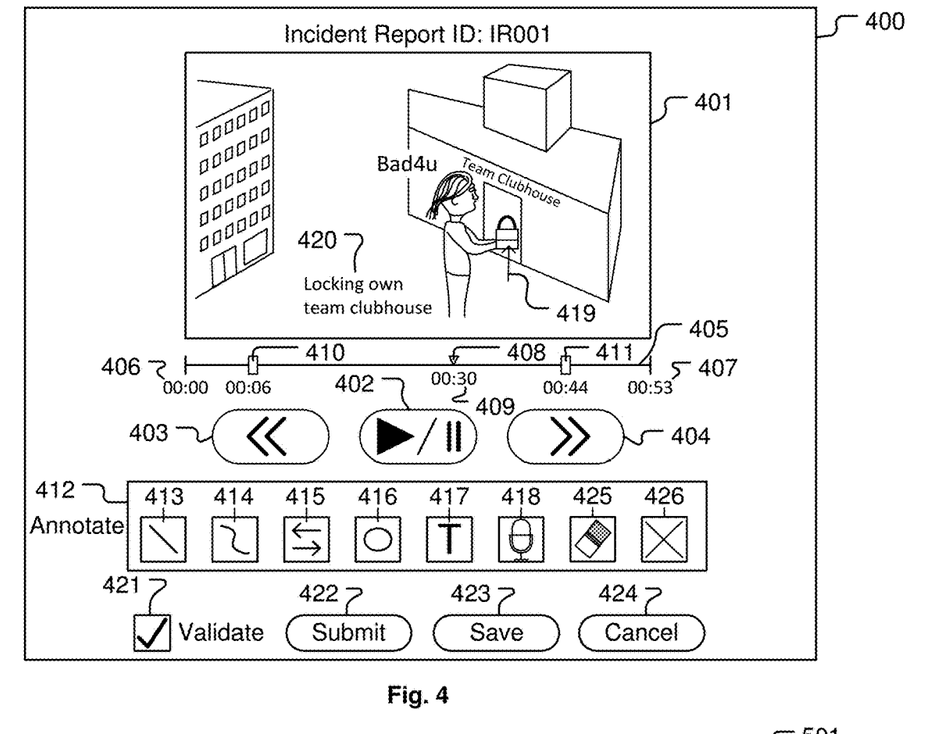
FIG. 4 shows an example GUI that is displayed upon activation of the review button in the GUI of FIG. 3 for a given disruptive behavior incident flag notification, in accordance with some embodiments.

FIG. 4 shows an example GUI 400 that is displayed upon activation of the review button in column 305 of the GUI 300 for a given disruptive behavior incident flag notification, in accordance with some embodiments. For example, the GUI 400 corresponds to user activation of the review button in column 305 for the disruptive behavior incident flag notification having the incident report identifier IR001. The GUI 400 includes a video clip display region 401 for playback of the automatically generated video clip that corresponds to the given disruptive behavior incident flag notification. In some embodiments, the GUI 400 includes a play/pause control 402 that when activated will cause playback of the video clip in the video clip display region 401, and that when activated again will pause playback of the video clip in the video clip display region 401, and so on. In some embodiments, the GUI 400 includes a rewind control 403 that when activated will move the video clip in the video clip display region 401 backward in playback time. In some embodiments, the GUI 400 also includes a forward control 404 that when activated will move the video clip in the video clip display region 401 forward in playback time.

In some embodiments, the GUI 400 includes a playback time line 405 extending from a start time 406 to an end time 407. In some embodiments, the time line 405 includes a current playback position marker 408 and current playback time 409. In some embodiments, the current playback position marker 408 is draggable by the user along the playback time line 405 to change the current playback time 409 and correspondingly change the frame of the video clip shown in the video clip display region 401. In some embodiments, the time line 405 includes a first clipping control 410 and a second clipping control 411. The first clipping control 410 is draggable by the user along the playback time line 405 to change an effective start time of the video clip, and the second clipping control 411 is draggable by the user along the playback time line 405 to change an effective end time of the video clip, such that the video clip for submission to the platform authority for platform moderator review in conjunction with the given disruptive behavior incident flag notification will be limited to the portion of the video clip extending from the effective start time as set by the first clipping control 410 to the effective end time as set by the second clipping control 411. In this manner, the GUI 400 enables the game player to adjust one or both of a start time and an end time of the generated video clip corresponding to the disruptive behavior incident flag notification.

In some embodiments, the GUI 400 includes an annotation toolbox 412 that enables the game player to add an annotation to the generated video clip corresponding to the disruptive behavior incident flag notification, as shown in the video clip display region 401. In some embodiments, the annotations are added as playback-time-dependent overlays to the video clip, such that the annotations will display on the video clip over a range of playback time of the video clip that was displayed when the annotation was added to the video clip. In some embodiments, the annotation toolbox 412 includes one or more of a straight line drawing tool 413, a curved line drawing tool 414, an arrow drawing tool 415, an oval drawing tool 416, a text tool 417 for making textual annotations, a voice recording tool 418 for associating an audible annotation with the video clip, an eraser tool 425 for erasing/correcting annotations, and a clear all tool 426 for clearing all annotations, among other annotation tools. Therefore, in some embodiments, the annotation made to the video clip by the game player is one or more of a textual message, a voice recording, and a graphical marking on the generated video clip corresponding to the disruptive behavior incident flag notification. In the example of FIG. 4, at the video clip playback time 00:30 corresponding to the current playback position marker 408, the video clip has been annotated by the game player to include an arrow 419 pointing to a lock used by the game player Bad4u to lock up the team's clubhouse and a text message 420 explaining that the game player Bad4u used the lock against their own team, which constitutes a disruptive behavior incident within the context of the example game. It should be understood that the content of the video clip for a given disruptive behavior incident flag notification and corresponding annotations is essentially limitless.

In some embodiments, the GUI 400 includes a validation indicator control 421 for applying the validation indicator to the corresponding disruptive behavior incident flag notification. Also, in some embodiments, the GUI 400 includes a submit control 422 that when activated by the user will cause submission of the corresponding disruptive behavior incident flag notification for platform moderator review. Also, in some embodiments, the GUI 400 includes a save control 423 that when activated by the user will save the current status of the corresponding disruptive behavior incident flag notification, including any annotations or playback adjustments that have been made to the video clip. In this manner, the GUI 400 provides for saving of the disruptive behavior incident flag notification and corresponding generated video clip in association with the account of the game player, without submission of the disruptive behavior incident flag notification and corresponding generated video clip for platform moderator review. Also, in some embodiments, the GUI 400 includes a cancel control 424 that when activated by the user will cause cancellation of the corresponding disruptive behavior incident flag notification, such that the corresponding disruptive behavior incident flag notification is removed from the database of the disruptive behavior incident flag notifications in table 301 of the GUI 300 in FIG. 3. Also, the listing of the disruptive behavior incident flag notifications in table 301 of the GUI 300 in FIG. 3 is automatically updated upon user activation of the validation indicator control 421, the submit control 422, and the cancel control 424 in the GUI 400 of FIG. 4.

Figure 5:
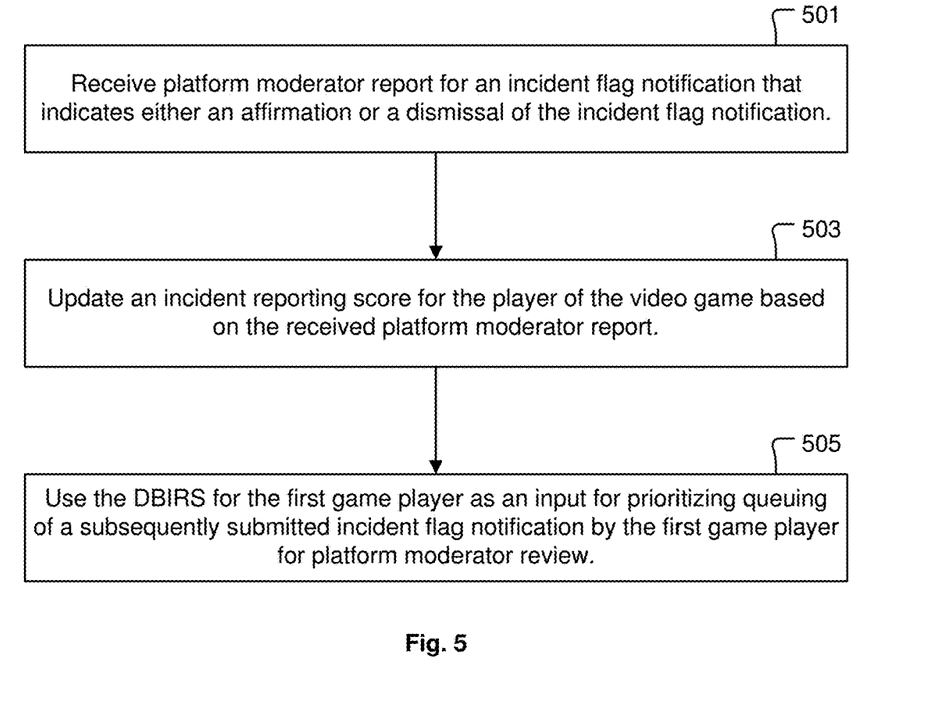
FIG. 5 shows a flowchart of a method for operating a server computing system in cloud-based gaming to quantitatively monitor a quality level for disruptive behavior incident reporting by a player of a video game, in accordance with some embodiments.

FIG. 5 shows a flowchart of a method for operating a server computing system in cloud-based gaming to quantitatively monitor a quality level for disruptive behavior incident reporting by a player of a video game, in accordance with some embodiments. In some embodiments, the method of FIG. 5 is performed as a continuation of the method of FIG. 2. The method includes an operation 501 for receiving a platform moderator report for a disruptive behavior incident flag notification that indicates either an affirmation or a dismissal of the disruptive behavior incident flag notification. The disruptive behavior incident flag notification is associated with an account of the player of the video game. Affirmation of the disruptive behavior incident flag notification indicates that the platform moderator determined that a disruptive behavior was present in the disruptive behavior incident flag notification. Dismissal of the disruptive behavior incident flag notification indicates that the platform moderator determined that a disruptive behavior was not present in the disruptive behavior incident flag notification.

The method also includes an operation 503 for operating the server computing system to update a disruptive behavior incident reporting score (DBIRS) for the player of the video game based on the received platform moderator report. Affirmation of the disruptive behavior incident flag notification in the platform moderator report causes the DBIRS for the player of the video game to increase. Conversely, dismissal of the disruptive behavior incident flag notification in the platform moderator report causes the DBIRS for the player of the video game to decrease. In some embodiments, the DBIRS for the player of the video game is computed as shown in Equation 1, where $N_{affirmed}$ is the total number of disruptive behavior incident flag notifications submitted by the player of the video game that have been affirmed by the platform moderator, and $N_{reviewed}$ is the total number of disruptive behavior incident flag notifications submitted by the player of the video game that have been reviewed and decided (either affirmed or dismissed) by the platform moderator.

$$DBIRS = \frac{N_{affirmed}}{N_{reviewed}} \cdot 100. \quad \text{Equation 1}$$

Equation 2 shows another example of how the DBIRS for the player of the video game may be computed in some embodiments, where $w_i$ is a severity weighting for an affirmed disruptive behavior incident flag notification (i), and where $w_i$ is within a range extending from 0 to 1, with $w_i=0$ corresponding to a lowest level of disruptive behavior severity and $w_i=1$ corresponding to a maximum level of disruptive behavior severity. It should be understood that the approaches for computing the DBIRS for the player of the video game as shown in Equations 1 and 2 are provided by way of example. In other embodiments, different computational techniques and algorithms can be used to compute the DBIRS for the player of the video game, so long as the DBIRS provides an indication of the accuracy and usefulness of the disruptive behavior incident flag notifications submitted by the player of the video game for platform moderator review.

$$DBIRS = \frac{\sum_{i=1}^{N_{affirmed}} w_i}{N_{reviewed}} \cdot 100. \quad \text{Equation 2}$$

The method of FIG. 5 continues with an operation 505 in which the server computing system operates to use the DBIRS for the first game player as an input for prioritizing queuing of a subsequently submitted disruptive behavior incident flag notifications by the first game player for platform moderator review. In some embodiments, incoming disruptive behavior incident flag notifications from a plurality of players are collectively sorted for platform moderator review by advancing disruptive behavior incident flag notifications received from players that have a higher DBIRS ahead of disruptive behavior incident flag notifications received from players that have a lower DBIRS. In some embodiments, the DBIRS of a given player has to meet or exceed a threshold value in order for a subsequently submitted disruptive behavior incident flag notification by the given player to be scheduled for platform moderator review. In these embodiments, the DBIRS for the given player may be reset to a value that exceeds the threshold value after a set amount of time has elapsed. In some embodiments, the DBIRS for the given player is reference by the platform moderator (human moderator) to obtain an indication of how reliable the given player is in making and submitting disruptive behavior incident flag notifications, which can guide the level attention paid (amount of time allocated) by the platform moderator in reviewing subsequent disruptive behavior incident flag notifications received from the given player.

In various embodiments, the server computing system maintains historical data on disruptive behavior incident flag notifications of each game player, such as how frequently each game player submits a disruptive behavior incident flag notification and how often the submitted disruptive behavior incident flag notifications by each game player are affirmed through the platform moderator review process. In some embodiments, the game players can be incentivized to develop and maintain a high DBIRS. For example, in some embodiments, in-game rewards, free game play opportunities, and/or other incentives can be issued to a game player who has a DBIRS that meets or exceeds a prescribed value. This incentivization process promotes higher quality disruptive behavior incident flag notifications by game players, which improves the efficiency of the platform moderator review process, and which ultimately improves the overall game ecosystem and game enjoyment by all players. In some embodiments, users may also be penalized and/or restricted by having a low DBIRS. For example, in some embodiments, in-game rewards, or free game play opportunities, and/or other incentives may be reduced for a game player who has a DBIRS that is below a prescribed value. In some embodiments, the GUI 300 of FIG. 3 shows the DBIRS 311 for the game player. Display of the DBIRS in the GUI 300 of FIG. 3 reminds the game player that their self-critical review of their own disruptive behavior incident flag notifications before submission for platform moderator review can have an impact on their ability to receive in-game incentives.

Figure 6:
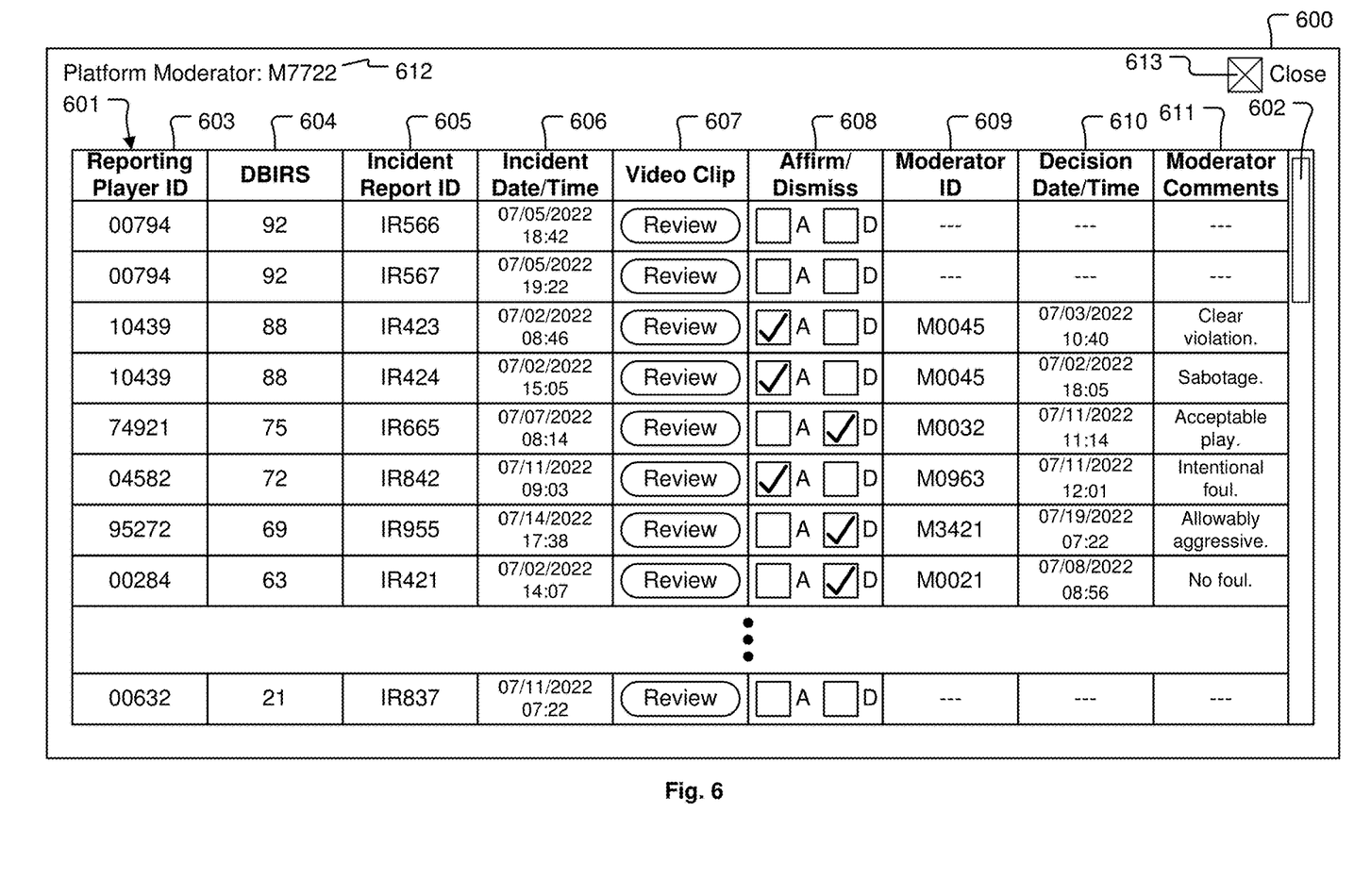
FIG. 6 shows an example GUI that is displayed to a platform moderator for review of received disruptive behavior incident flag notifications, in accordance with some embodiments.

FIG. 6 shows an example GUI 600 that is displayed to a platform moderator for review of received disruptive behavior incident flag notifications, in accordance with some embodiments. In some embodiments, the diagram of FIG. 6 corresponds to a schema implemented within a database system. The example GUI 600 is provided to the platform moderator for navigating, selecting, reviewing, and adjudicating disruptive behavior incident flag notifications throw by various game players, in accordance with some embodiments. The GUI 600 shows an identifier 612 of the platform moderator to whom the GUI 600 is displayed. In some embodiments, the identifier 612 is based on a secured login of the platform moderator. The GUI 600 also includes a close button 613, that when activated will close the GUI 600. In some embodiments, the GUI 600 shows a table 601 listing disruptive incident flag notifications that have been received from various players for platform moderator review and adjudication. In some embodiments, each row of the table 601 corresponds to a different disruptive incident flag notification. In some embodiments, the table 601 includes a scroll bar 602 for navigating to a particular row of the table 601.

In some embodiments, each row of the table 601 includes a column 603 that shows an identifier of the game player that threw the corresponding disruptive incident flag notification. In some embodiments, each row of the table 601 includes a column 604 that shows the DBIRS score for the game player that threw the corresponding disruptive incident flag notification. In some embodiments, each row of the table 601 includes a column 605 that shows an identifier for the corresponding disruptive incident flag notification. In some embodiments, each row of the table 601 includes a column 606 that shows a date and time at which the corresponding disruptive incident flag notification was thrown by the game player. In some embodiments, the date and time shown in the column 606 for a given disruptive incident flag notification is the date and time at the management server 105 when the given disruptive incident flag notification is received from the game player. In some embodiments, the date and time shown in the column 606 for a given disruptive incident flag notification is the date and time local to the game player when the given disruptive incident flag notification was thrown by the game player.

In some embodiments, each row of the table 601 includes a column 607 that shows a review button that when activated by the platform moderator will trigger display of another GUI that provides for playback and review of the video clip associated with the corresponding disruptive incident flag notification by the platform moderator, along with any annotations associated with the video clip, such as any annotations added to the video clip by the game player using the GUI of FIG. 4. In some embodiments, each row of the table 601 includes a column 608 that shows a user-selectable control operable by the platform moderator for applying an affirmed indicator (A) or a dismissed indicator (D) to the corresponding disruptive incident flag notification. In some embodiments, each row of the table 601 includes a column 609 that shows an identifier of the platform moderator who selected the affirmed indicator (A) or the dismissed indicator (D) in the column 608 for the corresponding disruptive incident flag notification. In some embodiments, each row of the table 601 includes a column 610 that shows a date and time at which the corresponding disruptive incident flag notification was adjudicated by the platform moderator identified in column 609 through selection of either the affirmed indicator (A) or the dismissed indicator (D) in column 608. In some embodiments, the date and time shown in the column 610 for a given disruptive incident flag notification is the date and time at the management server 105 when the given disruptive incident flag notification is adjudicated by the platform moderator.

Application of the affirmed indicator (A) in column 608 to a given disruptive behavior incident flag notification by the platform moderator identified in column 609 conveys that the platform moderator has reviewed the given disruptive behavior incident flag notification and has found that the given disruptive behavior incident flag notification does include a disruptive behavior event. Application of the dismissed indicator (D) in column 608 to a given disruptive behavior incident flag notification by the platform moderator identified in column 609 conveys that the platform moderator has reviewed the given disruptive behavior incident flag notification and has found that the given disruptive behavior incident flag notification does not include a disruptive behavior event. In some embodiments, each row of the table 601 includes a column 611 that provides for entry of comments by the platform moderator identified in the column 609 for the corresponding disruptive behavior incident flag notification. In some embodiments, the comments provided in column 611 provide some explanation for the adjudication decision represented in column 608.

Figure 7:
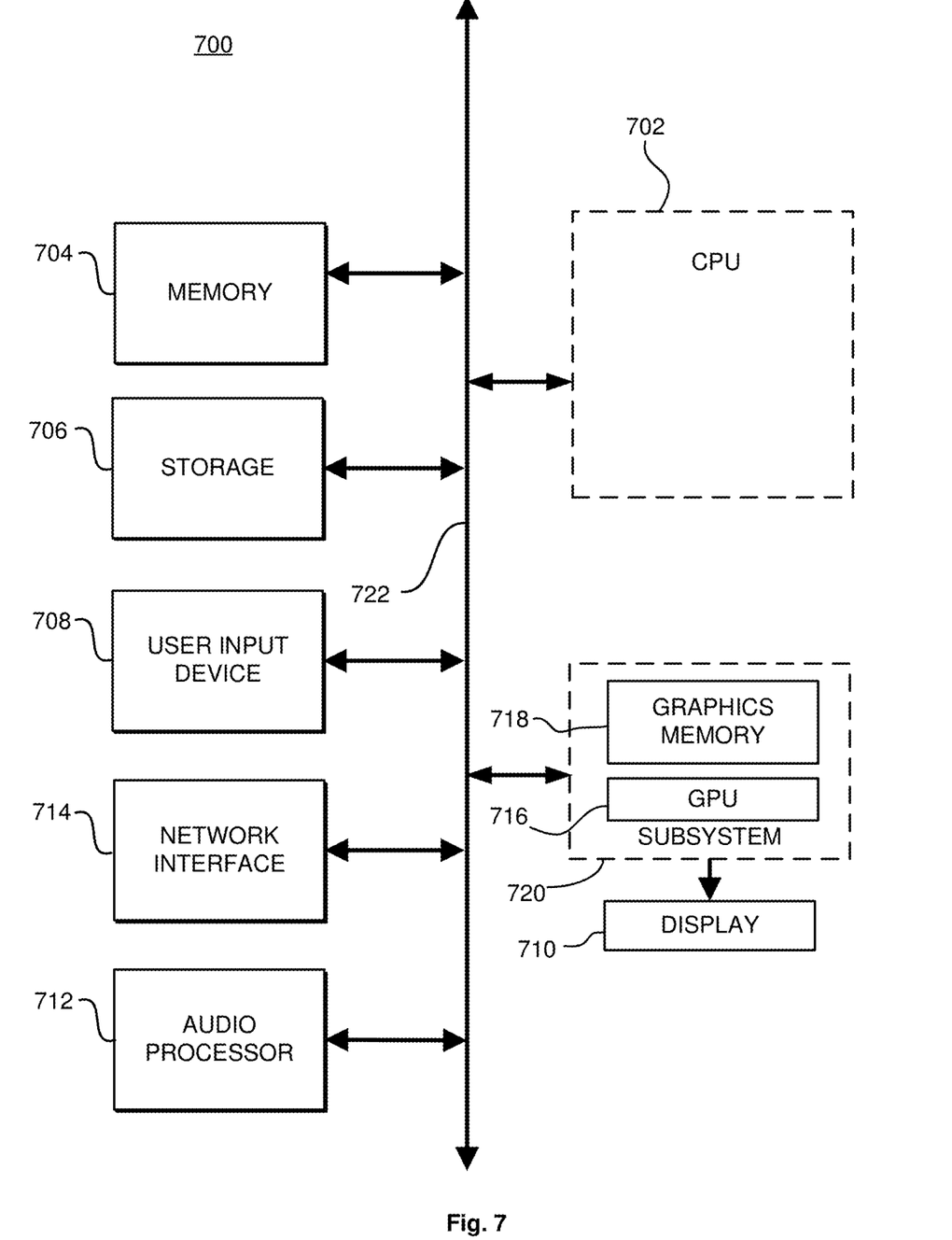
FIG. 7 illustrates components of an example server device that can be used to perform aspects of the various embodiments of the present disclosure.

FIG. 7 illustrates components of an example server device 700 that can be used to perform aspects of the various embodiments of the present disclosure. This block diagram illustrates the server device 700 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be localized to a player playing a game segment (e.g., game console), or remote from the player (e.g., back-end server processor), or one of many servers using virtualization in a game cloud system for remote streaming of game play to client devices.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 714, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from graphics memory 718 to be displayed on display device 710. Display device 710 can be any device capable of displaying visual information in response to a signal from the device 700, including CRT, LCD, plasma, and OLED displays. In addition to display device 710, the pixel data can be projected onto a projection surface. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), Gaming as a Service (GaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A cloud-based gaming system, comprising:
a server computing system programmed to receive a disruptive behavior incident flag notification from a first game player during interactive play of a video game, the disruptive behavior incident flag notification marking a time during interactive play of the video game corresponding to a potential disruptive behavior incident by a second game player, the server computing system programmed to enable the first game player to access and review the disruptive behavior incident flag notification and apply a validation indicator to the disruptive behavior incident flag notification, the server computing system programmed to receive the validation indicator from the first game player, the validation indicator directing the server computing system to prioritize the disruptive behavior incident flag notification for a platform moderator review, the server computing system programmed to receive a platform moderator report resulting from the platform moderator review that indicates either an affirmation or a dismissal of the disruptive behavior incident flag notification, the server computing system programmed to update an incident reporting score for the first game player based on the received platform moderator report, and the server computing system programmed to use the incident reporting score for the first game player as an input for prioritizing queuing of a subsequently submitted disruptive behavior incident flag notification by the first game player for platform moderator review.

2. The cloud-based gaming system as recited in claim 1, wherein receipt of the disruptive behavior incident flag notification by the server computing system does not interrupt interactive play of the video game by the first game player.

3. The cloud-based gaming system as recited in claim 1, wherein the disruptive behavior incident flag notification corresponds to a particular controller input pattern transmitted from the first game player to the server computing system.

4. The cloud-based gaming system as recited in claim 1, wherein the disruptive behavior incident flag notification corresponds to a particular voice command input transmitted from the first game player to the server computing system.

5. The cloud-based gaming system as recited in claim 1, wherein the disruptive behavior incident flag notification corresponds to a particular video-captured human gesture transmitted from the first game player to the server computing system.

6. The cloud-based gaming system as recited in claim 1, wherein the server computing system is programmed to automatically generate a video clip for the disruptive behavior incident flag notification that includes video of the interactive play of the video game by the first game player around the time marked by the disruptive behavior incident flag notification, wherein the server computing system is programmed to enable the first game player to adjust one or both of a start time and an end time of the generated video clip corresponding to the disruptive behavior incident flag notification.

7. The cloud-based gaming system as recited in claim 6, wherein the server computing system is programmed to enable the first game player to add an annotation to the generated video clip corresponding to the disruptive behavior incident flag notification.

8. The cloud-based gaming system as recited in claim 7, wherein the annotation is one or more of a textual message, a voice recording, and a graphical marking on the generated video clip corresponding to the disruptive behavior incident flag notification.

9. The cloud-based gaming system as recited in claim 6, wherein the server computing system is programmed to provide for saving of the disruptive behavior incident flag notification and corresponding generated video clip in association with an account of the first game player.

10. The cloud-based gaming system as recited in claim 1, wherein affirmation of the disruptive behavior incident flag notification in the platform moderator report causes the incident reporting score for the first game player to increase, and wherein dismissal of the disruptive behavior incident flag notification in the platform moderator report causes the incident reporting score for the first game player to decrease.

11. A method for operating a server computing system in cloud-based gaming, comprising:
receiving a disruptive behavior incident flag notification from a first game player during interactive play of a video game, the disruptive behavior incident flag notification marking a time during interactive play of the video game corresponding to a potential disruptive behavior incident by a second game player;
enabling the first game player to access and review the disruptive behavior incident flag notification and apply a validation indicator to the disruptive behavior incident flag notification;
receiving the validation indicator from the first game player for the disruptive behavior incident flag notification;
prioritizing the disruptive behavior incident flag notification and corresponding generated video clip for a platform moderator review in response to receipt of the validation indicator;
receiving a platform moderator report resulting from the platform moderator review that indicates either an affirmation or a dismissal of the disruptive behavior incident flag notification;
updating an incident reporting score for the first game player based on the received platform moderator report; and
using the incident reporting score for the first game player to prioritize queuing of a subsequently submitted disruptive behavior incident flag notification by the first game player for platform moderator review.

12. The method as recited in claim 11, wherein receiving the disruptive behavior incident flag notification does not interrupt interactive play of the video game by the first game player.

13. The method as recited in claim 11, wherein the disruptive behavior incident flag notification corresponds to a particular controller input pattern transmitted by the first game player.

14. The method as recited in claim 11, wherein the disruptive behavior incident flag notification corresponds to a particular voice command input transmitted by the first game player.

15. The method as recited in claim 11, wherein the disruptive behavior incident flag notification corresponds to a particular video-captured human gesture transmitted by the first game player.

16. The method as recited in claim 11, further comprising:
automatically generating a video clip for the disruptive behavior incident flag notification that includes video of the interactive play of the video game by the first game player around the time marked by the disruptive behavior incident flag notification; and
enabling the first game player to adjust one or both of a start time and an end time of the generated video clip corresponding to the disruptive behavior incident flag notification.

17. The method as recited in claim 16, further comprising:
enabling the first game player to add an annotation to the generated video clip corresponding to the disruptive behavior incident flag notification.

18. The method as recited in claim 17, wherein the annotation is one or more of a textual message, a voice recording, and a graphical marking on the generated video clip corresponding to the disruptive behavior incident flag notification.

19. The method as recited in claim 16, further comprising:
saving of the disruptive behavior incident flag notification and corresponding generated video clip in association with the account of the first game player.

20. The method as recited in claim 11, wherein affirmation of the disruptive behavior incident flag notification in the platform moderator report causes the incident reporting score for the first game player to increase, and wherein dismissal of the disruptive behavior incident flag notification in the platform moderator report causes the incident reporting score for the first game player to decrease.

* * * * *